(12) United States Patent
Roth

(10) Patent No.: US 6,783,104 B1
(45) Date of Patent: Aug. 31, 2004

(54) DEFORMABLE CLAMP EMPLOYED TO STIFFEN HANGER ROD

(76) Inventor: Steven A. Roth, P.O. Box 0933, Alamo, CA (US) 94507

( * ) Notice: Subject to any disclaimer, the term of this patent is extended or adjusted under 35 U.S.C. 154(b) by 25 days.

(21) Appl. No.: 10/319,024

(22) Filed: Dec. 11, 2002

Related U.S. Application Data

(63) Continuation-in-part of application No. 09/870,077, filed on May 30, 2001, now abandoned, and a continuation-in-part of application No. 09/836,955, filed on Apr. 17, 2001, now Pat. No. 6,454,232, which is a continuation-in-part of application No. 09/610,510, filed on Jul. 6, 2000.

(51) Int. Cl.$^7$ .................................................. F16B 1/00
(52) U.S. Cl. ........................... 248/230.1; 248/226.11; 248/49; 248/228.1
(58) Field of Search ...................... 248/231.61, 229.24, 248/229.14, 223.1, 226.11, 230.5, 230.1, 230.9, 65, 73, 62, 74.1, 67.7, 49

(56) References Cited

U.S. PATENT DOCUMENTS

| | | | |
|---|---|---|---|
| 706,903 A | 8/1902 | Crawford | |
| 1,123,107 A | * 12/1914 | Darr | |
| 1,318,503 A | 10/1919 | Meyer | |
| 1,362,244 A | 12/1920 | Farley | |
| 1,457,106 A | 5/1923 | Estep | |
| 1,804,472 A | 5/1931 | Leslie | |
| 2,416,063 A | 2/1947 | Nicholls | |
| 2,618,033 A | * 11/1952 | Tinnerman et al. | 24/81 |
| 3,015,140 A | * 1/1962 | Pender, Sr. | 24/73 |
| 3,121,549 A | 2/1964 | Loudon | 248/74 |
| 3,310,264 A | 3/1967 | Appleton | 248/72 |
| 3,316,605 A | 5/1967 | Tabbert | 24/277 |
| 3,414,219 A | * 12/1968 | Siegel | 248/65 |
| 4,318,518 A | 3/1982 | Davis | 248/60 |
| 4,441,677 A | 4/1984 | Byerly | 248/74.3 |
| D273,762 S | 5/1984 | Sakaguchi | D8/396 |
| 4,479,625 A | * 10/1984 | Martz | 248/74.1 |
| 4,856,739 A | 8/1989 | Takikawa | 248/74.2 |
| 4,944,683 A | 7/1990 | Leonardo | 439/96 |
| 5,004,194 A | 4/1991 | Watanabe | 248/74.5 |
| 5,284,110 A | 2/1994 | Hostetler | 119/72 |
| 5,297,890 A | * 3/1994 | Commins | 403/398 |
| 5,482,234 A | 1/1996 | Lyon | 248/74.5 |
| 5,564,659 A | 10/1996 | DeCapo | 248/72 |
| 6,257,530 B1 | * 7/2001 | Tsai | 248/74.2 |

OTHER PUBLICATIONS

SC228 Hanger Rod Assembly and the B22 Channel Combination Made Available by B–Line Systems, Inc. of Franklin Park, Illinois.

SC–UB Hanger Rod Stiffener Assembly Utilized With the B22 Channel, Made Available by B–Line Systems. Inc.

* cited by examiner

Primary Examiner—Leslie A. Braun
Assistant Examiner—Steven M. Marsh
(74) Attorney, Agent, or Firm—Thomas R. Lampe

(57) ABSTRACT

Stiffener apparatus for stabilizing a hanger rod includes a clamp having a mechanical fastener extending through openings formed in spaced clamp segments. The clamp is constructed of deformable material so that the clamp segments bend into engaged with a stiffener member extending along the hanger rod. Tightening of the mechanical fastener urges the stiffener member into tight engagement with the hanger rod.

5 Claims, 3 Drawing Sheets

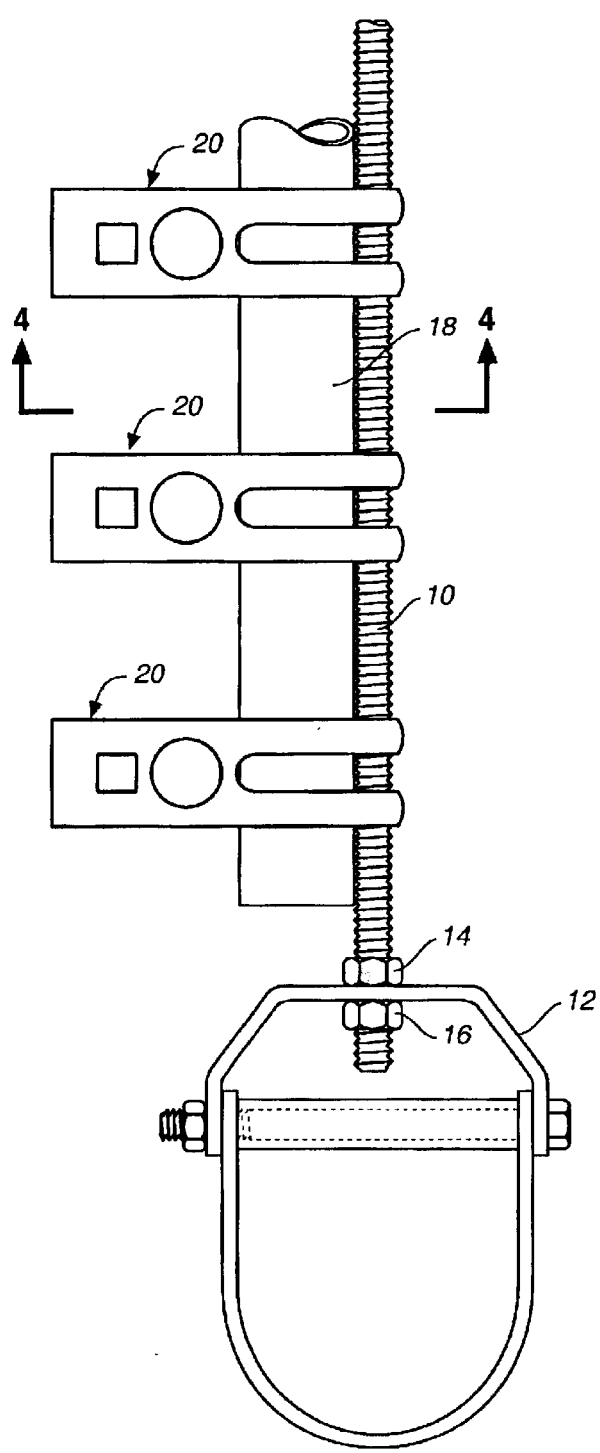
FIG._1
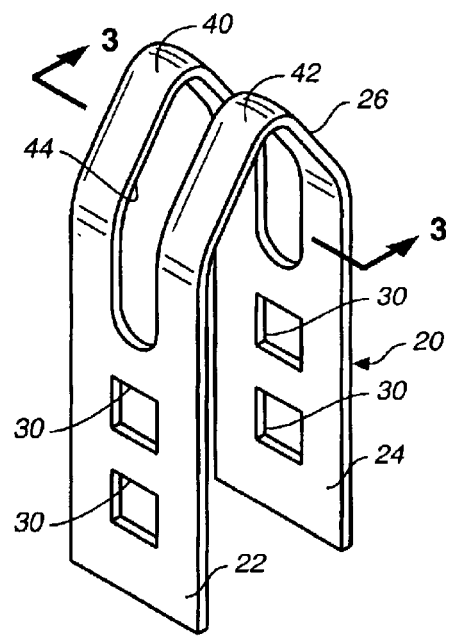
FIG._2
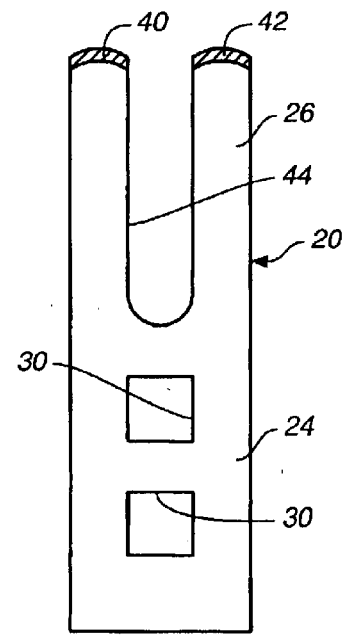
FIG._3

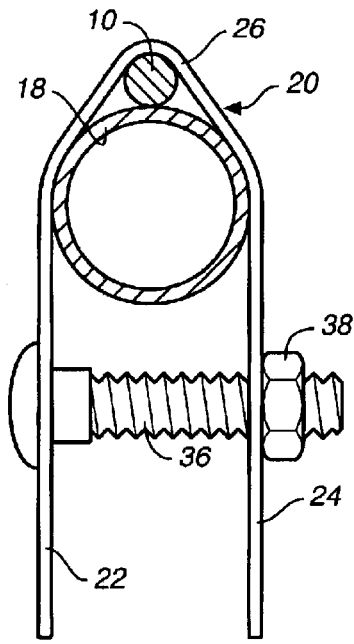 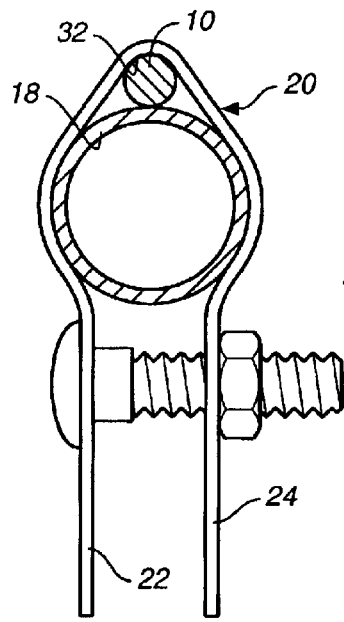 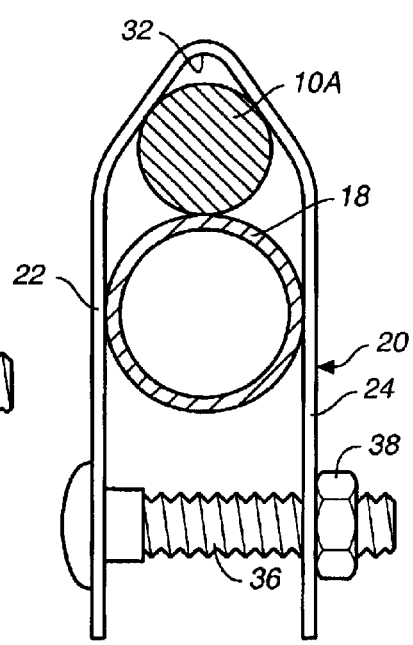
FIG._4A  FIG._4B  FIG._5
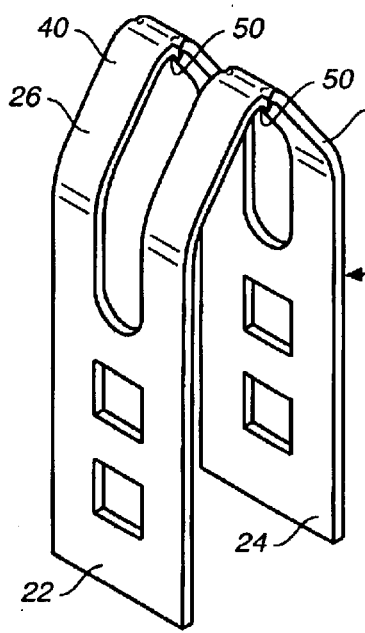 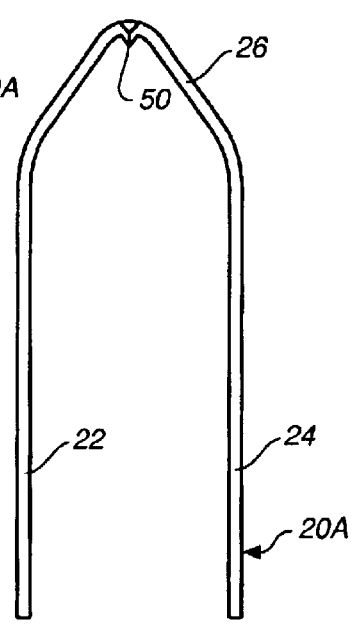 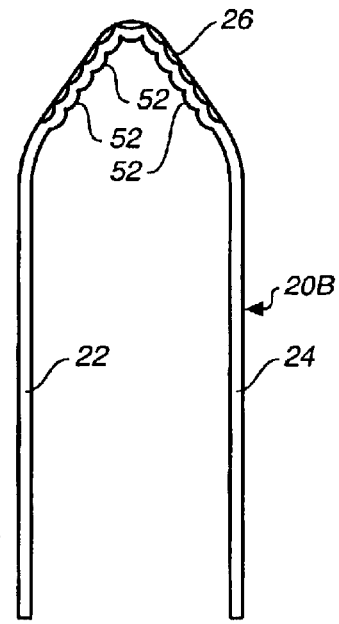
FIG._6  FIG._7  FIG._8

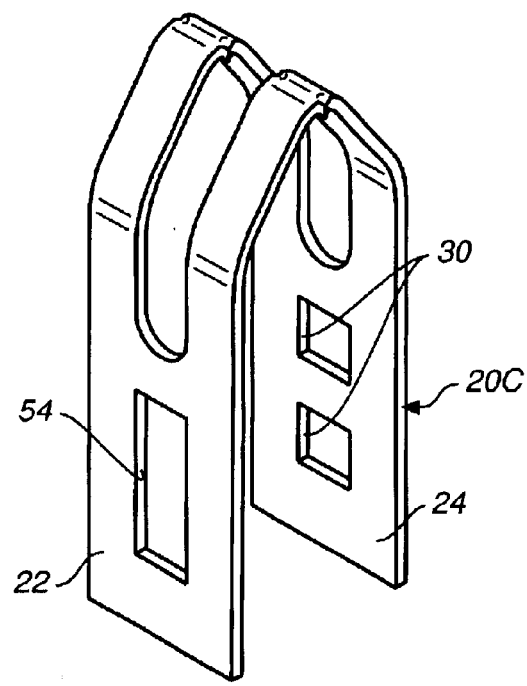
FIG._9
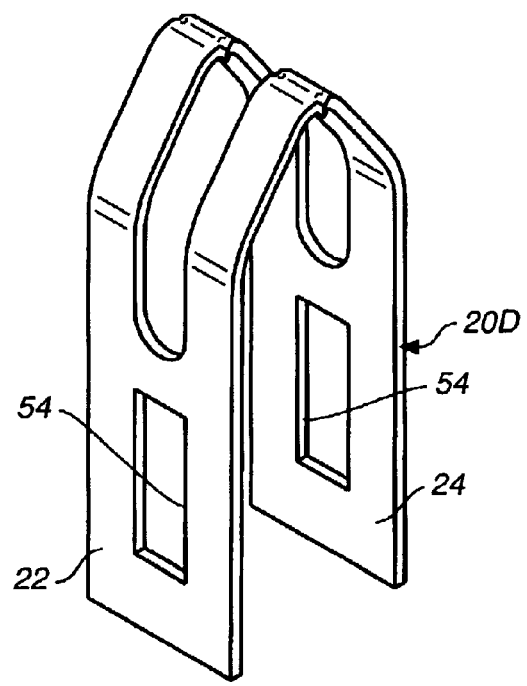
FIG._10

US 6,783,104 B1

DEFORMABLE CLAMP EMPLOYED TO STIFFEN HANGER ROD

This application is a continuation-in-part of U.S. patent application Ser. No. 09/870,077, filed May 30, 2001, now abandoned which in turn was a continuation-in-part of both U.S. patent application Ser No. 09/610,510, filed Jul. 6, 2000, and U.S. patent application Ser. No. 09/836,955, filed Apr. 17, 2001 now U.S. Pat. No. 6,454,232.

TECHNICAL FIELD

This invention relates to apparatus employed in the building construction industry and more particularly to stiffener apparatus for stabilizing a hanger rod employed to hold or support pipes, conduits or other components of a building from building structures.

BACKGROUND OF THE INVENTION

Various types of assemblies or devices have been devised for stabilizing or stiffening hanger rods, for example, for seismic bracing purposes. Such devices are often, but not always, associated with multi-directional bracing for electrical conduit, cable trays and mechanical piping systems. One common type of hanger rod stiffener assembly is that exemplified by the SC228 hanger rod assembly and the B22 channel combination made available by B-Line Systems, Inc. of Franklin Park, Ill. in which a clamp is disposed inside the channel rod stiffener to capture the threaded hanger rod and stiffen it.

Another well known approach is that exemplified by the SC-UB hanger rod stiffener assembly utilized with the B22 channel, also made available by B-Line Systems, Inc., wherein a U-bolt is connected to a flat two-hole plat by hex nuts, the threaded hanger rod being captured between the rounded portion of the U-bolt and the channel.

It is also known to use bolts similar to U-bolts but which are straight, rather than curved, at the closed end thereof, the straight closed end being orthogonal to the threaded legs of the bolt. Hanger rod slippage is a problem with this arrangement.

It is also known to weld hanger rod to a stiffener. This is time consuming and expensive. Furthermore, such a connection is permanent and a stiffener is not removable from the rod once welded into place.

All of the prior art arrangements noted above are characterized by their relative complexity, high expense and labor intensive installation. The following U.S. Patents are of record in above-identified U.S. patent application Ser. Nos. 09/870,077: 5,004,194, 5,482,234, 4,944,683, 4,318, 518, 1,804,472, 3,310,264, 3,121,549, 1,318,503, 4,856,739, 2,416,063, 4,441,677, D273,762, 706,903, 5,564,659, 5,284, 1101,457,106, 1,362,244 and 3,316,605.

The prior art does not teach the invention disclosed and claimed herein.

DISCLOSURE OF INVENTION

The present invention relates to a rod stiffener arrangement utilized to stabilize a hanger rod and which is readily employable to stiffen hanger rods of varying diameters. It also can utilize elongated stiffener members of differing shapes and sizes. The invention is characterized by its relatively low cost and ease of use. Installation is easily and inexpensively accomplished.

The stiffener arrangement of the present invention is for stabilizing a hanger rod and includes a clamp having first and second clamp segments formed of deformable material as well as a third clamp segment integral with and located between the first and second clamp segments. Each of the first and second clamp segments has a distal end spaced from the third clamp segment.

At least one mechanical fastener extends between the first and second clamp segments. The mechanical fastener is spaced from the third clamp segment and fastens the first and second clamp segments together.

An elongated stiffener member having an outer surface is disposed in a space defined by the first, second and third clamp segments along with the hanger rod extending parallel to the elongated stiffener member.

The mechanical fastener, upon tightening thereof, causes formation of bends in the first and second clamp segments conforming to the shape of and engaging the portion of the outer surface of the elongated stiffener member to urge the elongated stiffener member to a predetermined position relative to the hanger rod and the clamp and maintain the elongated stiffener member at said predetermined position.

Other features, advantages and objects of the present invention will become apparent with reference to the following description and accompanying drawings.

BRIEF DESCRIPTION OF DRAWINGS

FIG. 1 is an elevational view illustrating a hanger assembly including a hanger rod stiffened by apparatus constructed in accordance with the teachings of the present invention, including three clamps in position on the hanger rod and an elongated stiffener member in the form of a conduit;

FIG. 2 is a perspective view of a clamp constructed in accordance with the teachings of the present invention;

FIG. 3 is a cross-sectional view taken along the line 3—3 of FIG. 2;

FIG. 4A is a top plan view of the clamp located on a hanger rod and elongated stiffener member with a mechanical fastener associated with the clamp in untightened condition;

FIG. 4B is a view similar to FIG. 4A, but showing the configuration of the clamp when the mechanical fastener is tightened.;

FIG. 5 is a view similar to FIG. 4A, but illustrating a larger diameter hanger rod than that shown in FIGS. 4A and 4B;

FIG. 6 is a perspective view of al alternative embodiment of the clamp;

FIG. 7 is a top plan view of the clamp of FIG. 6;

FIG. 8 is,a view similar to FIG.7, but illustrating a third embodiment of clamp;

FIG. 9 is a perspective view of a fourth clamp embodiment; and

FIG. 10 is a perspective view of a fifth embodiment of a clamp constructed in accordance with the teachings of the present invention.

MODES FOR CARRYING OUT THE INVENTION

FIG. 1 illustrates a conventional hanger assembly including a threaded hanger rod 10 and a pipe holder bracket or yoke 12 supported thereby. Nuts 14, 16 connect the yoke to the hanger rod. The upper end of the hanger rod (not shown) depends from building structure, such as ceiling structure, in a well known manner. The threaded hanger rod has a predetermined diameter and length and has a substantially cylindrically-shaped, threaded outer peripheral surface.

In order to stiffen the hanger rod and structure supported thereby against seismic movement or movement induced by other means, an elongated stiffener member in the form of a conduit, pipe or tubing 18 is positioned alongside the threaded hanger rod in engagement therewith. Conduit 18 has a longitudinal axis extending parallel to the longitudinal axis of the hanger rod. Conduit 18 has a cylindrically-shaped outer peripheral surface with a diameter greater than the diameter of the hanger rod. The length of the conduit is not greater than the length of the hanger rod and typically will be less than the hanger rod length as shown.

In the illustrated embodiment, three clamps 20 are employed to tightly secure the conduit 18 and hanger rod together. The clamps are spaced from one another. Suitable structural bracing such as wires, connector rods, brackets and the like (not shown) may be affixed to clamps 20 and secured to adjacent building structure to prevent undesired movement of the hanger assembly, the support member and clamps, for example movement caused by an earthquake.

Each clamp 20, as shown in FIGS. 1–4B, is of integral construction. The clamp is formed of deformable material, suitably sheet metal.

Clamp 20 has a first clamp segment 22 and a second clamp segment 24. A third clamp segment 26 is integral with and located between the first and second clamp segments. The first and second clamp segments define openings 30 between the distal ends thereof and the third clamp segment. In the embodiment being described, two such openings are formed in each of the clamp segments 22, 24.

The third clamp segment 26 includes two interconnected third clamp segment portions diverging outwardly from their location of interconnection in the direction of the first and second clamp segments to define a generally V-shaped recess.

FIG. 4A shows clamp 20 in place on the hanger rod and elongated stiffener member or conduit extending laterally therefrom. The conduit and hanger rod are disposed in a space defined by the first, second and third clamp segments and a threaded bolt 36, the hanger rod extending parallel to the elongated stiffener member i.e., with the longitudinal axes thereof being parallel.

The hanger rod 10 is positioned between the third clamp segment at the recess 32 and the stiffener member.

A mechanical fastener in the form of threaded bolt 36 and a nut 38 extends through two of the aligned openings 30.

Next, the nut is tightened so that the first and second clamp segments are moved toward one another as shown in FIG. 4B. It will also be noted that bends are formed in the clamp segments 22, 24 as tightening takes place so that the deforming first and second clamp segments conform to the shape of a portion of the outer surface of the conduit. Forces are applied by the bent clamped segments 22, 24 urging conduit 18 in the direction of hanger rod 10 and third clamp segment 26 to a predetermined position in the clamp. The hanger rod is thus locked into place in the clamp along with the conduit and in parallel relationship thereto when tightening of the nut and bolt is terminated, the stiffener member or conduit being maintained at the predetermined position.

The clamp, specifically third clamp segment 26, is maintained in tight engagement with the threads of the threaded hanger rod to resist sliding of the clamp on the hanger rod. Deformation of the first and second clamp segments further results in the hanger rod being brought into tight engagement with both of the diverging third clamp segment elements. The configuration of the third clamp segment also centers the hanger rod in the recess along a line extending between the location of interconnection between the third clamp segment elements and the longitudinal axis of the elongated stiffener member. Centering of the conduit and hanger rod relative to one another is automatically accomplished during tightening of the nut. This adds to stability of the arrangement.

It should be noted that the third clamp segment includes two portions 40, 42. As perhaps may best be seen with reference to FIG. 3, these portions 40, 42 have an arcuate or curved cross-section with the outer ends or edges of the arcs formed thereby engaging the threads of the hanger rod when the clamp 20 is installed. This feature resists vertical movement of the clamp relative to the hanger rod. The third clamp segment portions 40, 42 define an elongated opening 44 therebetween which makes the third clamp segment easier to bend and conform to the shape of the hanger rod.

It has been found that tightening of the nut 28 causes torquing of one or more of the clamp segments, causing an edge or edges thereof to bite into either or both of the conduit and threaded hanger rod to further secure the components of the system together against relative movement.

FIG. 5 is a view similar to FIG. 4A, but illustrating the clamp 20 accommodating a larger diameter hanger rod 10A. In this installation the threaded bolt 36 is disposed in the outermost set of openings 30 to provide sufficient space to accommodate the conduit and larger diameter hanger rod. It will be appreciated that the first and second clamp segments 22, 24 shown in FIG. 5 will also bend when the mechanical fastener is tightened to curve around into contact with that portion of the conduit opposed to hanger rod 10A. This will force the conduit 18 and hanger rod 10A into tight engagement with each other as well as force the hanger rod into tight engagement with third clamp segment 26.

FIG. 6 illustrates a second embodiment of a clamp constructed in accordance with the teachings of the present invention. Claim 20A differs from clamp 20 in that sharpened projections 50 are formed in the third clamp segment portions 40, 42. These projections may be formed in any desirable fashion, such a stamping the sheet metal. The projections can be burrs, for example. It will be appreciated that projections 50 will engage the threads of the hanger rod associated therewith when the clamp 20A is installed on a hanger rod and associated elongated stiffener member.

The clamp 20B shown in FIG. 8 differs from that shown in FIGS. 6 and 7 in that it includes a plurality of projections or detents 52 formed along the length of third clamp segment 26.

The clamp 20C shown in FIG. 9 differs from clamp 20A shown in FIGS. 6 and 7 in that only one of the clamp segments, first clamp segment 24, incorporates two spaced square openings 30. First clamp segment 22, on the other hand, incorporates a single elongated rectangular-shaped opening 54 which accommodates a bolt passing through either of the openings 30.

FIG. 10 shows a clamp 20D wherein each of the first and second clamp segments defines only a single elongated, rectangular opening 54.

The invention claimed is:

1. In combination:

a vertically disposed threaded hanger rod of predetermined diameter and length having a longitudinal axis and substantially cylindrically-shaped, threaded outer peripheral surface; and a stiffener apparatus stabilizing said threaded hanger rod, said stiffener apparatus comprising:

a clamp integrally constructed of deformable sheet metal having deformable first and second clamp segments and a deformable third clamp segment integral with and located between said first and second clamp segments, each of said first and second clamp segments having a distal end spaced from said third clamp segment, said first and second clamp segments defining openings spaced from said third clamp segment, and said third clamp segment including two interconnected third clamp segment elements diverging outwardly from a location of interconnection thereof in the direction of said first and second clamp segments to define a generally V-shaped recess accommodating said threaded hanger rod with said third clamp segment partially surrounding said threaded hanger rod, said first, second and third clamp segments having clamp segment outer edges, said clamp extending laterally from said threaded hanger rod;

a threaded bolt extending between said first and second clamp segments through said openings at a location on the clamp spaced from said third clamp segment;

a nut threadedly engaged with said threaded bolt, said threaded bolt and nut fastening together said first and second clamp segments; and an elongated stiffener member with a longitudinal axis having a substantially cylindrically-shaped outer peripheral surface with a diameter greater than the diameter of said threaded hanger rod and having a length no greater than the length of said threaded hanger rod extending parallel to said threaded hanger rod with the longitudinal axes of said elongated stiffener member and threaded hanger rod being parallel, said elongated stiffener member having a side thereof in engagement with said threaded hanger rod and having said outer peripheral surface thereof disposed in a space defined by said first, second and third clamp segments and said threaded bolt along with said threaded hanger rod, said generally V-shaped recess comprising a portion of said space, said threaded bolt and nut being spaced from said elongated stiffener member and disposed on a side of said elongated stiffener member opposed to the side of said elongated stiffener member engaged by said threaded hanger rod, and said first and second clamp segments being spaced from one another adjacent to the outer surface of the elongated stiffener member between said threaded bolt and said elongated stiffener member, said threaded bolt and said nut upon tightening of said nut causing interaction between said clamp and said elongated stiffener member resulting in deformation of said first and second clamp segments and decrease in the size of the space therebetween to form bends in said first and second clamp segments conforming to the shape of and engaging a portion of the outer surface of said elongated stiffener member in opposition to said threaded hanger rod to urge the threaded hanger rod and said elongated stiffener member toward one another and into direct tight engagement and continuously maintain the threaded hanger rod and said elongated stiffener member in direct tight engagement and further maintain the clamp in direct tight engagement with the threads of the threaded hanger rod to resist sliding of the clamp on the threaded hanger rod, said deformation of said first and second clamp segments further resulting in said threaded hanger rod being brought into direct tight engagement with both of said third clamp segment elements to position said threaded hanger rod in said generally V-shaped recess with said threaded hanger rod disposed along a line extending between the location of interconnection between said third clamp segment elements and the longitudinal axis of said elongated stiffener member and further resulting in deformation of said third clamp segment elements to cause said third clamp segment elements to conform to the shape of the threaded hanger rod with said third clamp segment elements in direct tight engagement with said threaded hanger rod, at least one of said first, second and third clamp segments being in torqued condition resulting from deformation thereof with a clamp segment outer edge thereof biting into at least one of said elongated stiffener member and said threaded hanger rod to resist relative movement between the clamp and said elongated stiffener member and said threaded hanger rod.

2. The combination according to claim 1 including at least one projection projecting inwardly from one of said clamp segments into said space and engaging at least one of said elongated stiffener member and said threaded hanger rod to resist movement of said clamp relative thereto.

3. The combination according to claim 2 wherein said at least one projection projects inwardly from said third clamp segment and engages the threaded hanger rod.

4. The combination according to claim 1 wherein said third clamp segment includes spaced third clamp segment portions defining an elongated opening therebetween.

5. The combination according to claim 4 wherein said third clamp segment portions comprise arcs having curved cross sections and wherein the outer edges of the third clamp segment comprise arc edges engaging the threaded hanger rod.

* * * * *